United States Patent [19]
Kaufman et al.

[11] Patent Number: 4,588,661
[45] Date of Patent: May 13, 1986

[54] FABRICATION OF GAS IMPERVIOUS EDGE SEAL FOR A BIPOLAR GAS DISTRIBUTION ASSEMBLY FOR USE IN A FUEL CELL

[75] Inventors: Arthur Kaufman, West Orange; John Werth, Princeton, both of N.J.

[73] Assignee: Engelhard Corporation, Menlo Park, N.J.

[21] Appl. No.: 644,831

[22] Filed: Aug. 27, 1984

[51] Int. Cl.$^4$ .................. H01M 4/88; H01M 8/24
[52] U.S. Cl. ..................... 429/36; 29/623.2; 427/115
[58] Field of Search ............. 429/36; 29/623.2; 427/115

[56] References Cited

U.S. PATENT DOCUMENTS 4,450,212  5/1984  Feigenbaum et al. ............ 429/36

FOREIGN PATENT DOCUMENTS

0157063  9/1983  Japan ............................ 29/623.2

Primary Examiner—Donald L. Walton

[57] ABSTRACT

A bipolar gas reactant distribution assembly for use in a fuel cell is disclosed, the assembly having a solid edge seal to prevent leakage of gaseous reactants wherein a pair of porous plates are provided with peripheral slits generally parallel to, and spaced apart from two edges of the plate, the slit being filled with a solid, fusible, gas impervious edge sealing compound. The plates are assembled with opposite faces adjacent one another with a layer of a fusible sealant material therebetween the slits in the individual plates being approximately perpendicular to one another. The plates are bonded to each other by the simultaneous application of heat and pressure to cause a redistribution of the sealant into the pores of the adjacent plate surfaces and to cause the edge sealing compound to flow and impregnate the region of the plates adjacent the slits and comingle with the sealant layer material to form a continuous layer of sealant along the edges of the assembled plates.

19 Claims, 6 Drawing Figures

FABRICATION OF GAS IMPERVIOUS EDGE SEAL FOR A BIPOLAR GAS DISTRIBUTION ASSEMBLY FOR USE IN A FUEL CELL

BACKGROUND OF THE INVENTION

The present invention relates to improved gas distribution assemblies for use in fuel cells, to fuel cells employing such elements, and to processes for making such elements.

Reference is hereby made to other relates patent applications which are assigned to the same assignee as the present application; application of Charles J. Dettling and Peter L. Terry entitled "Integral Gas Seal For Fuel Cell Gas Distribution Assemblies and Method of Fabrication", Ser. No. 484,014, now U.S. Pat. No. 4,505,992 Filed Apr. 11, 1983, application of H. Feigenbaum and A. Kaufman entitled "Integral Gas Seal For Fuel Cell Gas Distribution Plate", Ser. No. 430,453, Filed on Sept. 30, 1982, application of H. Feigenbaum and S. Pudick entitled "A Process For Forming Integral Edge Seals in Porous Gas Distribution Plates Utilizing A Vibratory Means", Ser. No. 430,291, Filed on Sept. 30, 1982, and U.S. Pat. No. 4,450,212 of H. Feigenbaum, S. Pudick and R. Singh entitled "Edge Seal For Porous Gas Distribution Plate Of A Fuel Cell".

Fuel cell design and operation generally involves conversion of a hydrogen-containing fuel and some other oxidant via an exothermic reaction into D.C. electrical power. This reaction is well-known and has established parameters and limitations. It has been known for some time that fuel cells can be extremely advantageous as power supplies, particularly for certain applications such as a primary source of power in remote areas. It is highly desirable that any such cell assembly be extremely reliable. Various fuel cell systems have been devised in the past to accomplish these purposes. Illustrative of such prior art fuel cells are those shown and described in U.S. Pat. Nos. 3,709,736, 3,453,149 and 4,175,165. A detailed analysis of fuel cell technology comparing a number of different types of fuel cells appears in the "Energy Technology handbook" by Douglas M. Consadine, published in 1977 by McGraw Hill Book Company at pages 4-59 to 4-73.

U.S. Pat. No. 3,709,736, assigned to the assignee of the present invention, describes a fuel cell system which includes a stacked configuration comprising alternating fuel cell laminates and electrically and thermally conductive impervious cell plates. The laminates include fuel and oxygen electrodes on either side of an electrolyte comprising an immobilized acid. U.S. Pat. No. 3,453,149, assigned to the assignee of this invention, is illustrative of such an immobilized acid electrolyte. The fuel cells further comprise gas distribution plates, one in electrical contact with the anode and one in electrical contact with the cathode. The gas distribution plates conduct the reactant materials (fuel and oxidant) to the fuel cell.

In order to electrically interconnect a group of discrete cells to form one larger fuel cell stack, bipolar assemblies are commonly used. For instance, in U.S. Pat. No. 4,175,165, assigned to the assignee of the present invention, a stacked array of fuel cells is described wherein reactant gas distribution plates include a pluraltiy of gas flow channels or grooves for the distribution of the reactants. The grooves for the hydrogen gas distribution are arranged orthogonally relative to the grooves for the oxygen distribution.

The gas distribution plates themselves, whether they are part of termination assemblies having individual distribution plates for one or the other of the reactants or bipolar assemblies having two distribution plates for distributing both reactants in accordance with this disclosure, are formed of an electrically conductive impervious material. Where bipolar plates are prepared from a non-porous material, such as aluminum, the plate is typically coated with a layer of non-corrosive material, such as gold, so as to effectively isolate it from the corrosive agents, such a the electrolyte, within the fuel cell environment. In more recent fuel cell designs, the gas distribution plates of such assemblies are formed of a porous material so that a more uniform and complete flow of gas over the electrode surface is provided.

In previous systems wherein nonporous gas distribution plates were utilized, the reactants always flowed only through the grooves and were contained by the walls thereof. However, in the more recent systems utilizing porous plates, it has been necessary to seal the porous plates along the edges, and in bipolar assemblies, to segregate the reactants from one another to avoid their unintended mixing which could cause the cells to operate improperly or fail altogether.

Various techniques for sealing such porous gas distribution plates are known. For example, in aforementioned copending application Ser. No. 484,014, there is disclosed a porous bipolar gas distribution assembly, provided with an integral inner impervious region formed in two porous plates, preferably carbon, at the interface between the two plates by impregnating a sealant material therein. When impregnated into the porous plates, the sealant material acts as a bond to hold the plates together in a single integral bipolar assembly. Grooves are machined in the carbon plates on the outer facing surfaces opposite the interface layer, the grooves of one plate being substantially perpendicular to the grooves of the other plate. The impervious region prohibits reactant gases from mixing via through-plane transmission but permits electrical conductivity from plate to plate through the impervious region.

The bipolar gas distribution plate assemblies are fabricated by positioning a layer of sealant material between two porous plates and then simultaneously applying pressure and elevated temperature to the plates and layer of sealant material to melt the layer. The material in the layer impregnates the porous plates as it melts to bond the plates together. Through the proper selection of film thickness, pressure and temperature, the thermoplastic sealant film flows into the pores along the surface of each of the contiguous plates thereby effectively bonding one plate to the other and sealing each such plate along this common interface against gas transfer. Further, before the pressure on the bipolar assembly is removed, cooling is allowed to occur to a lower temperature.

In one embodiment of the disclosed process, a thermoplastic film of sealant, such as polyethersulphone, is sandwiched between two untreated porous carbon plates. This sandwich is placed in a hot-press, the temperature of the hot-press is elevated to heat the composite to a temperature in the range of approximately 500°-700° F., and the sandwich compressed under a pressure of approximately 200 to 500 psi. The temperature is maintained for a suitable period of time, such as ½ hour, and the length of the compression cycle is varied with the flow characteristics of the various sealant material. Subsequent to the completion of the compression cycle, the resultant sandwich is maintained under the compressive load within the press and cooled to ensure fusion of the lamina prior to release of pressure.

In completing the fabrication of the bipolar gas distribution assembly, it is necessary to seal the edges of the plates to prevent reactant gases from exiting through the plate edges and mixing together, for as already indicated, if leakage occurs, the cells could operate improperly or fail altogether.

Edge sealing of carbonaceous bipolar plates is normally done by coating the edges with a suspension of a sealant that leaves a continuous carbonaceous film or coating on the edge after the solvent has been evaporated. This is a labor-intensive operation and presents a hazard because of the noxious fumes released during drying of the applied edge coating.

Accordingly, the present invention provides an improved process for forming an edge seal in a bipolar gas distribution plate.

There is disclosed a process as above wherein the edge seal is formed simultaneously with the fabrication of the bipolar gas distribution assembly using a solid sealant compound thereby eliminating the need for a subsequent edge sealing step and avoiding the noxious fume problem.

SUMMARY OF THE INVENTION

In accordance with this invention, a process is provided for the manufacture of a bipolar gas distribution assembly for use in a fuel cell, the assembly having a solid edge seal to prevent leakage of gaseous reactants. A pair of porous plates are provided with two peripheral slits cut through the plates, the slits being generally parallel to and spaced apart from two edges of the plate. The slits are filled with a solid, fusible, gas impervious, edge sealing compound. After filling the slits with the edge sealing compound, a pair of plates are assembled with an opposed face of each plate adjacent one another with a layer of sealant material which is also fusible interposed therebetween. The assembled plates are laminated to each other by the simultaneous application of heat and pressure. This causes a redistribution of the sealant layer material into the pores of the plate surfaces simultaneous with causing the edge sealing compound to melt and impregnate the region surrounding the slit. As a result, the edge sealing compound is caused to be diffused into and be combined with a portion of the redistributed sealant layer to form a continuous layer of sealant along the edges of the assembly. Thereafter, the assembly is cooled, preferably under pressure. If desired, the unimpregnated edge of the assembly may be trimmed off to expose the continuous edge seal.

BRIEF DESCRIPTION OF THE DRAWINGS

The invention will now be described with regard to the following drawings and description in which like elements have been given common reference numbers.

DETAILED DESCRIPTION OF THE PREFERRED EMBODIMENTS

Figure 1:
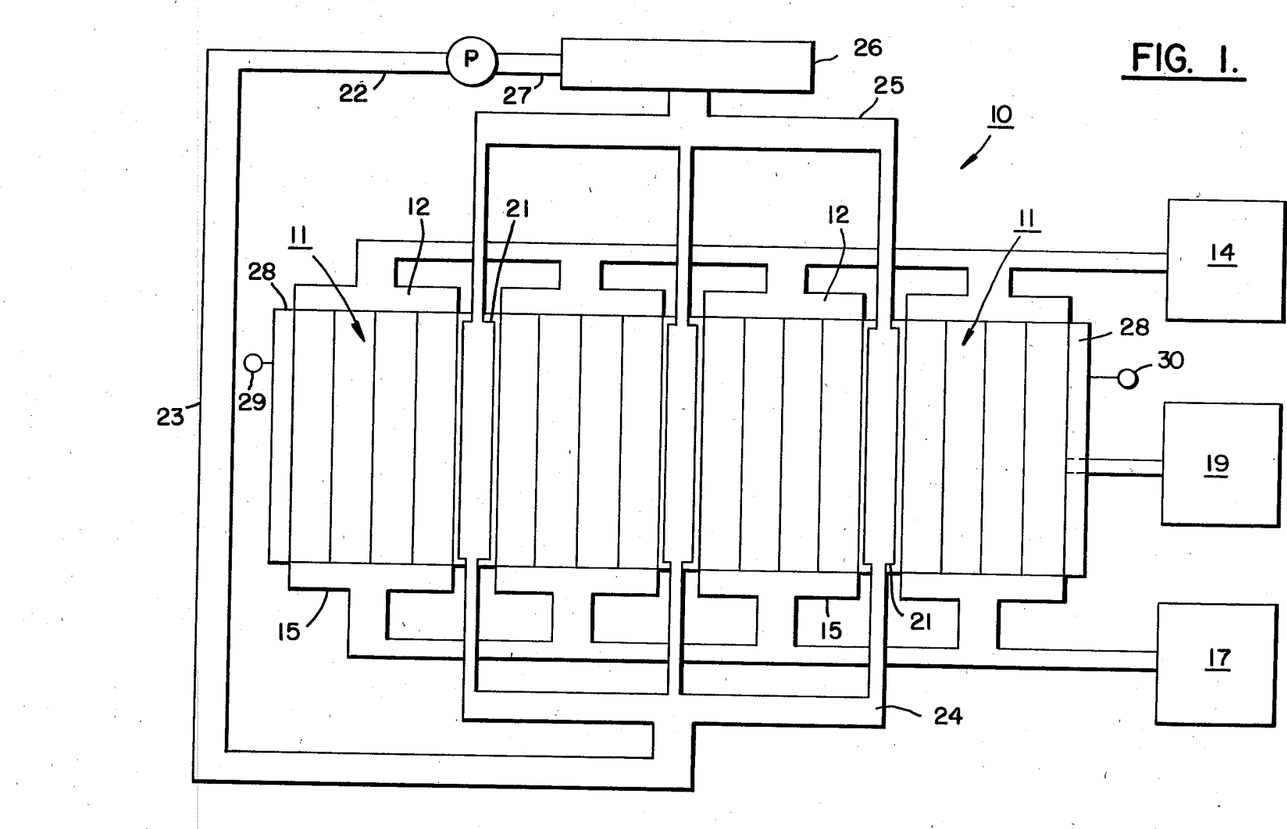
FIG. 1 is a schematic representation of a fuel cell assembly comprising a plurality of stacked fuel cells with intermediate cooling plates and terminal current collecting plates.

An exemplary fuel cell stack assembly 10 employing a plurality of fuel cells 11 in accordance with this invention is now described with reference to FIGS. 1 and 2. Hydrogen gas input manifolds 12 are arranged along one side of the stack assembly 10. While a plurality of manifolds 12 are shown for each group of fuel cells 11, if desired, a single manifold arrangement could be used. The manifolds 12 are connected to a source of hydrogen gas 14. Hydrogen gas collecting manifolds 15 are arranged along the opposing stack side in correspondence with the gas input manifolds 12. Here again, while a plurality of manifolds 15 are shown, a single manifold could be used if desired. The collecting manifolds 15 are, in turn, connected to a hydrogen gas discharging or recirculating system 17. The hydrogen gas from the input manifolds 12 flows through gas distribution plates 18 to the collecting manifolds 15.

In a similar fashion, a plurality of oxygen or air input manifolds (not shown) are arranged along the stack side (not shown) connecting the one stack side and the opposing stack side. These oxygen manifolds are connected to an oxygen source 19. The oxygen may be supplied in the form of air rather than pure oxygen if desired. In a similar fashion, a plurality of collecting manifolds are arranged along the stack side (not shown) opposing the stack side having the oxygen input manifolds and connecting the respective one stack side and opposing stack side. These manifolds could also be connected to an oxygen storage or recirculating system (not shown). The oxygen or air from the input manifolds (not shown) flows through the oxygen gas distribution plates 20 to the respective collecting manifolds (not shown).

In this embodiment, cooling plates 21 are arranged periodically between adjacent fuel cells 11. Three cooling plates 21 are shown arranged intermediate each four cell 11 array. The cooling fluid flowing through the cooling plates 21 can be any suitable material such as a dielectric high temperature oil manufactured by Monsanto under the trade name "Therminol." A pump 22 circulates the cooling fluid via conduit 23 and input manifold 24 into the respective cooling plates 21. The cooling fluid then flows into collecting manifold 25 which is connected to a heat exchanger 26 for reducing the temperature of the cooling fluid to the desired input temperature. A conduit 27 then connects the heat exchanger back to the pump 22 so that the fluid can be recirculated through the respective cooling plates 21.

The fuel cells 11 and the cooling plates 21 are electrically conductive so that when they are stacked as shown, the fuel cells 11 are connected in series. In order to connect the stack assembly 10 to a desired electrical load, current collecting plates 28 are employed at the respective ends of the stack assembly 10. Positive terminal 29 and negative terminal 30 are connected to the current collecting plates 28 as shown and may be connected to the desired electrical load by any conventional means.

Each fuel cell 11 is made up of a plurality of elements and includes a hydrogen gas distribution plate 18 and an oxygen or air distribution plate 20. Arranged intermediate the respective gas distribution plates 18 and 20 are the following elements starting from the hydrogen gas distribution plate 18: anode 31, anode catalyst 32, electrolyte 33, cathode catalyst 34 and cathode 35. These elements 31-35 of the fuel cell 11 may be formed of any suitable material in accordance with conventional practice.

The hydrogen gas distribution plate 18 is arranged in contact with the anode 31. Typically, the anode comprises a carbon material having pores which allow the hydrogen fuel gas to pass through the anode to the anode catalyst 32. The anode 31 is preferably treated with Teflon (polytetrafluoroethylene) to prevent the electrolyte 33, which is preferably an immobilized acid, from flooding back into the area of the anode. If flooding were allowed to occur, the electrolyte would plug up the pores in the anode 31 and lessen the flow of hydrogen fuel through the cell 11.

The anode catalyst 32 is preferably a platinum containing catalyst. The cell 11 is formed of an electrically conductive material, such as a carbon based material except for the immobilized acid electrolyte layer which does not conduct electrons but does conduct hydrogen ions. The various elements, 18, 31-35, and 20 are compressed together under a positive pressure. The electrolyte 33, such as phosphoric acid, is immobilized by being dispersed in a gel or paste matrix so that the acid is not a free liquid. An exemplary electrolyte matrix could comprise a mixture of phosphoric acid, silicon carbide particles and Teflon particles.

The cathode catalyst 34 and the cathode 35 are formed of the same types of materials as the respective anode catalyst 32 and anode 31. Therefore, the anode 31 and the cathode 35 comprise porous carbon and the anode catalyst 32 and cathode catalyst 34 can comprise a platinum containing catalyst. The cathode 35 can also be treated with Teflon to prevent the electrolyte from flooding back into the porous carbon comprising the cathode.

Figure 2:
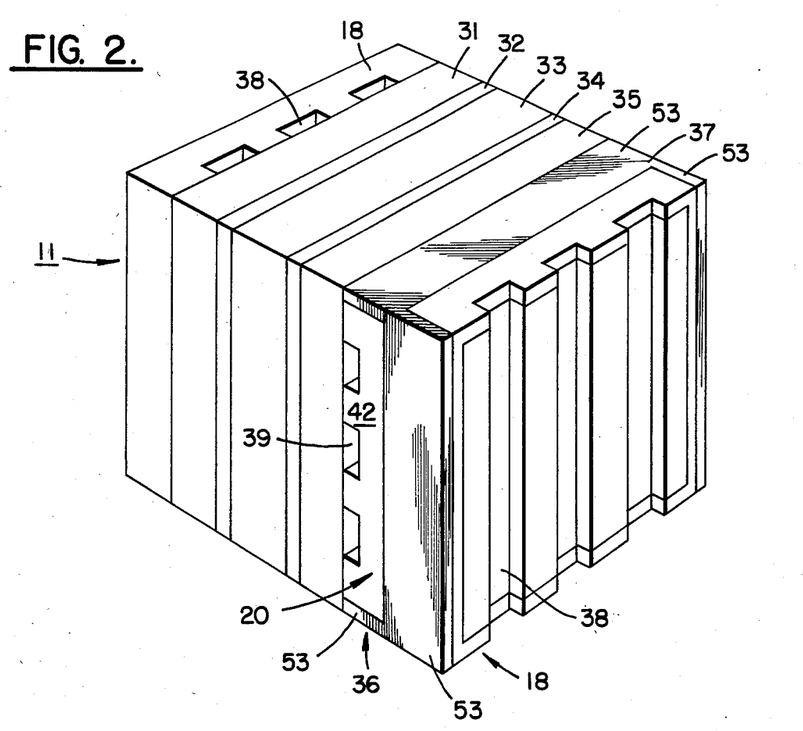
FIG. 2 is a perspective view of a portion of the fuel cell assembly of FIG. 1 illustrating an individual fuel cell having bipolar assemblies in greater detail.

All of the elements of the cell 11 are arranged in intimate contact as shown in FIG. 2. In order to provide an electrically interconnected stack assembly 10, bipolar assembly 36 is used to connect together adjacent fuel cells 11. A bipolar assembly 36 is comprised of a hydrogen gas distribution plate 18 and an oxygen or air distribution plate 20 bonded together at inner impervious interface region 37 shown cross-hatched. The hydrogen distribution plate 18 is edge-sealed with an impervious edge sealing compound 53 running generally parallel to grooves 39. Oxygen plate 20 has similarly disposed edge sealing compound 53 running prallel to its grooves 38. Therefore, a bipolar assembly 36 is comprised of the hydrogen gas distribution plate 18 of one cell 11 and the oxygen or air gas distribution plate 20 of the next adjacent cell 11. The interface region 37 and edge seals 53 will be described in more detail hereinafter in connection with the description of FIGS. 4, 5 and 6.

In order to facilitate the gas flow in the gas distribution plates 18 and 20, respective channels or grooves 38 or 39 are employed. The grooves 38 in the hydrogen gas distribution plate 18 are arranged orthogonally to the grooves 39 in the oxygen or air gas distribution plate 20. This allows the grooves to be easily connected to respective input and output manifolds 12 and 15, for example, on opposing sides of the cell stack assembly 10. Although grooves within a particular plate, such as plates 18 or 20, are shown as extending in a unidirectional manner in FIG. 2, there also can be cross-channels made between these grooves to aid in the distribution of the fluidic reactant materials. When such cross-channels are utilized, the primary flow of reactants is still in the direction of the grooves 38 and 39 shown in FIG. 2; that is, in the direction that the reactants flow between the reactant's input and collecting manifolds.

The gas distribution plates 18 and 20 supply the respective hydrogen and oxygen or air gases to the surfaces of their respective anode 31 or cathode 35. In order to more evenly distribute the respective gases at the anode 31 or cathode 35 plate surfaces, the gas distribution plates 18 and 20 are formed of a porous material such as porous carbon. This allows the respective gases to flow through the pores of the plates 18 and 20 between the respective channels 38 or 39 to provide more uniform gas distribution over the face of the respective anode 31 or cathode 35.

Figure 3:
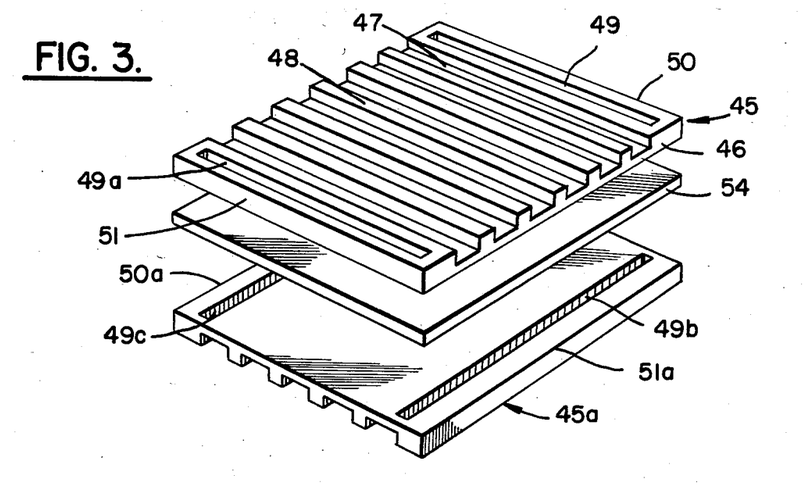
FIG. 3 is an exploded perspective view of the bipolar plate assembly showing the individual porous gas distribution plates provided with either horizontal or vertical peripheral slits for insertion of the edge sealing material before assembly of the bipolar plate.

Referring now to FIG. 3, there is shown a porous top plate 45 having a flat face 46 and a grooved face 47, the grooves 48 forming gas distribution passageways when assembled with a fuel cell electrode. The plate 45, when assembled with a second similar bottom plate 45a at their opposed flat faces, forms the bipolar gas distribution assembly 36. The grooved face of the plate faces the electrodes when assembled in a fuel cell. The grooved face of the top plate is further provided with linearly extending horizontal peripheral slits indicated generally at 49 and 49a.

Slits 49 and 49a, preferably of equal width and length, are machined through the grooved face generally parallel to and spaced apart from the edges 50, 51, which are in turn generally parallel to the grooves 48. The slits are adapted to receive a shaped section; i.e., strips or rods of a solid, fusible, gas impervious thermoplastic edge seal compound 53. The cross-sectional area of the slits 49, and 49a are selected so that when the slits are filled with the edge seal compound, they will accommodate an amount of compound necessary to provide an edge seal of sufficient thickness; e.g., approximately 0.030 to 0.150 inch, to substantially prevent leakage of gas exiting through the edges of the assembled plates.

As an example, the plate 45 consists of a porous carbon base having a length of approximately 14 inches, a width of approximately 11 inches and a thickness of approximately ⅛ inch. The slits 49, 49a cut through the thickness of the plate 45 are approximately 0.100 inch wide and run linearly along the marginal edges of the plate 45 along its horizontal axis. To fill the slits 49, 49a with edge sealant compound, an elongated strip ⅛×11 inches of a solid, non-porous fusible thermoplastic resin, such as polyethersulfone, is inserted in the slits to snugly fit therein whereby the strip is firmly held in place during subsequent laminating operations. The above dimensions, being approximate, are for purposes of illustration only, as are the particular materials described above from which the plate and edge seal may be formed, and should not add any limitations to the invention beyond those required by the prior art.

Grooved bottom plate 45a, of identical dimensions as plate 45, is provided with vertical slits 49b and 49c, which are also of identical dimension as slits 49 and 49a; e.g. 0.100 inch, cut through the vertical axis of plate 45a and spaced apart from the vertical edges 50a and 51a of the plate 45a. A layer of thermoplastic sealant material 54 is positioned between the plates 45 and 45a. When aligned for assembly as shown in FIG. 4, the horizontal slits 49 and 49a intersect and overlap the vertical slits 49b and 49c at right angles to each other.

Figure 4:
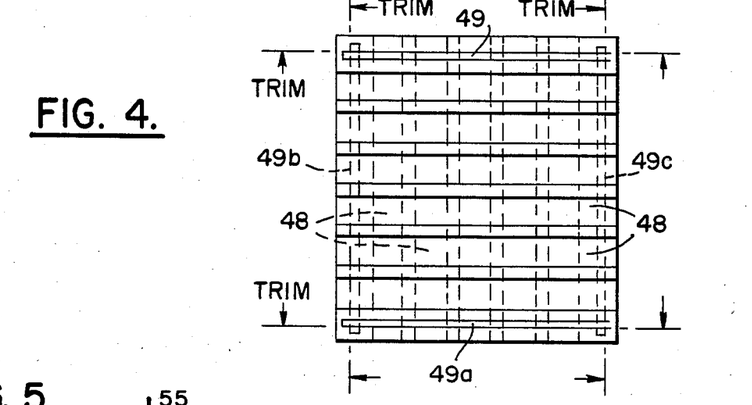
FIG. 4 is a perspective view of the bipolar plate in an assembled state prior to lamination showing the horizontal and vertical peripheral slits overlapped at right angles to each other.
Figures 5, 6:
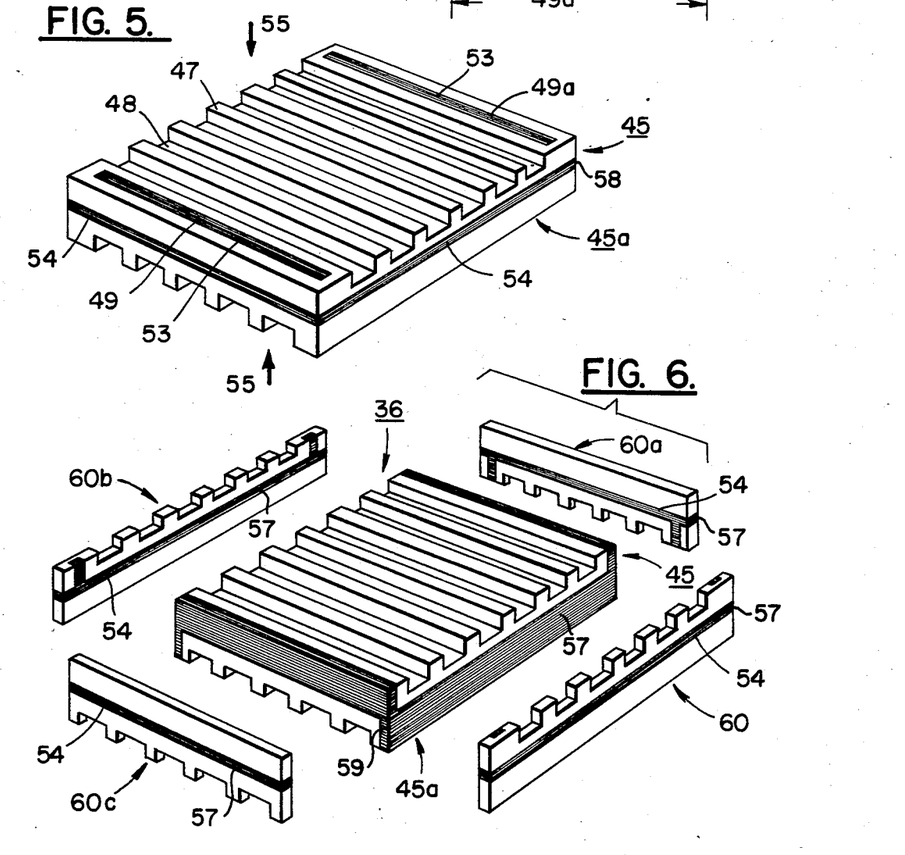
FIG. 5 is a perspective view of the bipolar plate of FIG. 4 wherein the peripheral slits are packed with edge seal material in accordance with the invention.
FIG. 6 is a perspective view of the porous bipolar gas distribution plate assembly made in accordance with the present invention showing the trimming of the marginal edge portions of the individual plates which are not impregnated with edge sealing material.

Referring now to FIG. 5, two identical porous distribution plates 45 and 45a of the type illustrated in FIGS. 3 and 4 having slits 49, 49a and 49b, 49c, respectively, filled with edge sealing compound 53 are shown with a layer of thermoplastic sealant material 54 positioned therebetween.

The assembly of plates 45 and 45a and layer of sealant 54 are pressed together under pressure by any suitable press (such as shown by the arrows in FIG. 5), to form a bipolar plate assembly. The temperature of the assembly is elevated to a relatively high temperature while the pressure is being applied causing the layer of sealant material 54 to melt and diffuse into the pores of the plate surfaces. The edge sealing compound placed in the slits 49, 49a, 49b and 49c is caused to be fused into and comingle with the sealant material interposed between the plates. The sealant form an integral impervious region 57, as shown in FIG. 6, at the interface 58 of the assembled plates.

When the proper amount of thickness of sealant layer material 54, pressure and elevated temperature are used, the layer 54 completely impregnates the adjacent plate surfaces to form the gas impervious region 57 leaving substantially no sealant material except through the pores between adjacent plate surfaces. Intimate contact at the interface 58 of the plates 45 and 45a thereby results to provide good electrical conductivity.

Simultaneous with the melting and diffusion of sealant material 54, the edge sealing compound 53 contained in the slits 49, 49a, 49b and 49c also melts under the heat and pressure used to laminate the plates 45 and 45a. The melted edge sealing compound fills the walls of the slits and impregnates the plate area adjacent thereto with the molten sealing compound. A portion of the molten sealing compound 53 combines with a portion of molten sealant layer 54 abutting the slit. The combined portions of edge sealing compound 53 and the sealant layer 54 form a continuous layer 59 of sealant along the opposed edges of the bipolar plate assembly whereby a gas impervious seal along the laminated bipolar plate edge is created.

After the plates have been laminated, the pressure preferably continues to be applied while the plates 45 and 45a are allowed to cool to a lower temperature. This process results in the plates 45 and 45a being bonded and held in electrical contact by an impervious region 57 to form a single porous bipolar gas distribution plate assembly. The plates 45 and 45a have good surface porosity, extremely low through-plane porosity for the transmission of reactants across interface 58, but good through-plane electrical conductivity between the plates.

Thereafter, if desired, the cooled, laminated bipolar plate, as shown in FIG. 6, can be trimmed to remove, as waste, the unimpregnated edge portions 60, 60a, 60b, 60c of the bipolar plate and to fully expose the continuous edge seals that have been formed during the lamination step of bipolar plate assembly process.

The porous plates 45 and 45a are preferably porous carbon plates. For instance, the plates can be reticulated vitreous carbon (RVC) plates; needled-felt plates; or graphite plates. RVC plates have relatively large pores, approximately 0.1 to 1.0 millimeter size, while needled-felt plates have relatively small pores approximately 0.01 to 0.1 millimeter size. Graphite plates can be made of the same material as that commercially available for use in industrial graphite electrodes. They are molded or extruded elements made from graphite particles. Graphite plates have relatively very small pores, approximately 0.001 to 0.01 millimeter size. The graphite material is the preferred material for use as plates 45 and 45a.

Any suitable solid thermoplastic or thermosetting compound may be selected as a composition for use as edge seal and sealant layer materials. For convenience and compatibility, it is preferred that a common material be chosen as the edge seal and sealant layer composition, this material being fusible and resistant to deterioration under the hot acid; e.g. phosphoric acid at 350°–450° F. environment to which the bipolar plate assembly may be exposed during use in a fuel cell. Suitable candidate material include FEP Teflon (fluorinated ethylene-propylene), polyparabanic acid, polyethersulphone, polysulphone, polyphenylsulphone and PFA Teflon (perflorinated alkoxy tetrafluoroethylene). Some of the above materials may be best suitable to lower temperature fuel cells or pre-selected electrolytes or reactants.

With respect to specific temperatures and pressures used to laminate the bipolar plate assembly, the pressure applied to the two carbon plates 45 and 45a by press 55 as shown in FIG. 5 must be great enough to force the two opposite surfaces of the plates together in intimate contact but must not be so great as to crush the plate material. In using RVC for plates 45 and 45a, the pressure is lowered to approximately 200 psi since RVC material is very brittle and may crack at higher pressures. In using needled-felt plate material, a pressure of about 1260 psi was used.

Once the assembly of plates and layer of sealant material are placed in the press, the temperature is elevated to within a range of between approximately 500° and 750° F., but preferably about 700° F. plus or minus 20°. Generally, it takes approximately three or four minutes for the assembly and the press to heat up to the elevated temperature and stablize from the ambient room temperature.

After heating takes place for the allotted time, the assembly is cooled, generally to about 350° F. under pressure. Cooling can take place naturally by turning off the heater or by forced cooling such as by utilizing fans or a water spray. Cooling is continued until the edge seal compound and sealant material are sufficiently solidified at which time the pressure on the assembly can be removed.

One example of a bipolar assembly produced by the process of the invention is as follows: A graphite plate material 0.125 inch thick was used for the gas distribution plates. Two slits approximately 0.090 inch wide and 11 inches long were cut through this first plate linearly along the vertical lengths of the plate generally parallel to the opposed edges of the plate and spaced ¼ inch from each edge 0.125×11 inch strips of solid polyethersulfone were inserted in the slits cut through the plate.

A second plate was prepared having identical dimensions to the first plate except that two slits 0.090 inch wide and 14 inches long were cut through the plate along the horizontal axis thereof. Strips of solid polyethersulfone 0.125 inch high×14 inches long were placed in the horizontal slits. The first and second plates were then assembled with the slits of the first and second plates at right angles to each other.

A layer of polyethersulphone sealant material approximately 0.005 inch thick was placed between the plates prior to assembly. The graphite plate-sealant assembly was then held together at approximately 400 lbs. per square inch at approximately 700° F. for approximately ½ hour. The assembly was then cooled to approximately 300° F. under a pressure of approximately 400 lbs. per square inch. A ¼ inch of unimpregnated edge material was trimmed from the cooled assembled bipolar plate to expose the ends of the edge seals which now extended along the entire length of the opposed edges of the bipolar plate. The appearance of the plate was excellent and the electrical resistance of the film bond was 1.8 millivolt at 150 amperes per square foot which was excellent. The bipolar assembly was leak-tested with good results. As in other portions of this description, immediately above, parameters are approximate only and not intended to limit the invention in any way.

The disclosures of the aforesaid patents and pending applications are hereby incorporated in their entirety herein by reference. It should be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

We claim:

1. A process for the preparation of a bipolar gas reactant distribution assembly having solid, gas impervious edge seals to prevent leakage of gaseous reactants, which comprises
   providing a pair of porous plate members provided with peripheral slits, the slits being generally parallel to, and spaced from each of two edges of the plate,
   filling the slits with a non-porous, fusible gas impervious edge sealing compound,
   assembling the plate members with the slits therein approximately perpendicular to one another and a layer of fusible sealing material interposed therebetween,
   hot pressing the assembly at a temperature sufficient to cause a redistribution of the sealant layer into the pores of the adjacent plate surfaces and the edge sealing compound to flow and impregnate the region of the plates adjacent the slits and comingle with the redistributed sealant material to form a continuous layer of sealant along the edges of the assembly.

2. The process as in claim 1 wherein the porous plate member is made of needled-felt carbon material.

3. The process as in claim 1 wherein the porous plate member is made of graphite.

4. The process as in claim 1 wherein the sealant layer material is a thermoplastic resin material.

5. The process as in claim 1 wherein the sealant layer material is polyethersulfone.

6. The process as in claim 1 wherein the edge sealing compound and the sealant layer material have the same composition.

7. A process as in claim 1 further including the steps of cooling the assembly and then removing the pressure applied thereto.

8. A process as in claim 1 wherein said elevated temperature is between about 500° and about 750° F.

9. A process as in claim 1 wherein said temperature is about 700° F.

10. A process as in claim 1 wherein the pressure applied to said plates is at least approximately 200 lbs. per square inch.

11. A process as in claim 1 wherein the layer of sealant material is approximately 0.003 to 0.020 inches thick.

12. The process as in claim 1 wherein the unimpregnated edge portions of the assembly are removed to fully expose the continuous edge seals formed during hot pressing of the assembly.

13. A process as in claim 1 further comprising the step of placing grooves on opposite sides of said bipolar assembly to distribute fuel cell reactant materials.

14. A porous bipolar gas distribution assembly comprised of two porous plate members bonded at opposite faces thereof with a first layer of fusible sealant material and having a seal portion along the edges of the assembly formed from a second layer of fusible sealant material, the first sealant layer being combined with the second sealant layer to form a continuous layer of sealant along the edges of the assembly.

15. An assembly as in claim 14 wherein the porous plate members are made of needled-felt carbon material.

16. An assembly as in claim 14 wherein the porous plate mambers are made of graphite.

17. An assembly as in claim 14 wherein the sealant layer materials are a thermoplastic resin material.

18. An assembly as in claim 14 wherein the sealant layer materials have the same composition.

19. An assembly as in claim 18 wherein the sealant layer and edge seal materials are formed of polyethersulfone.

* * * * *

UNITED STATES PATENT AND TRADEMARK OFFICE
CERTIFICATE OF CORRECTION

PATENT NO. : 4,588,661
DATED : May 13, 1986
INVENTOR(S) : Arthur Kaufman and John Werth It is certified that error appears in the above-identified patent and that said Letters Patent are hereby corrected as shown below:

Column 1, line 12, delete: [relates], replace with: --related--.

Column 2, line 13, delete: [a], replace with: --as--.

Column 5, line 62, delete: [prallel], replace with: --parallel--.

Column 7, line 47, please add following the word "molten" --edge--.

Column 8, line 50, delete: [stablize], replace with: --stabilize--.

Column 10, line 47, delete: [mambers], replace with: --members--.

Signed and Sealed this

Eighth Day of September, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,588,661
DATED : May 13, 1986
INVENTOR(S) : A. Kaufman, J. Werth

It is certified that error appears in the above-identified patent and that said Letters Patent is hereby corrected as shown below:

In Column 1, before the "BACKGOUND OF THE INVENTION" please add the following new paragraph --The Government has rights in this invention pursuant to Contract No. DEN3-241 awarded by the National Aeronautics and Space Administration.--.

Signed and Sealed this

Twenty-second Day of November, 1988

Attest:

DONALD J. QUIGG

*Attesting Officer*  *Commissioner of Patents and Trademarks*